(12) United States Patent
Minor et al.

(10) Patent No.: US 11,760,667 B2
(45) Date of Patent: Sep. 19, 2023

(54) WATER TREATMENT SYSTEM

(71) Applicant: THIRD WAVE WATER LLC, Cedarville, OH (US)

(72) Inventors: Taylor Minor, Cedarville, OH (US); Charles R. Nick, Centerville, OH (US)

(73) Assignee: Third Wave Water, Cedarville, OH (US)

( * ) Notice: Subject to any disclaimer, the term of this patent is extended or adjusted under 35 U.S.C. 154(b) by 696 days.

(21) Appl. No.: 16/661,396

(22) Filed: Oct. 23, 2019

(65) Prior Publication Data

US 2020/0055753 A1  Feb. 20, 2020

Related U.S. Application Data

(63) Continuation of application No. PCT/US2018/028888, filed on Apr. 23, 2018.
(Continued)

(51) Int. Cl.
*C02F 1/00* (2023.01)
*C02F 1/68* (2023.01)
(Continued)

(52) U.S. Cl.
CPC .............. *C02F 1/687* (2013.01); *C02F 1/001* (2013.01); *C02F 1/008* (2013.01); *A47J 31/404* (2013.01);
(Continued)

(58) Field of Classification Search
CPC .......... C02F 1/001; C02F 1/008; C02F 1/687; C02F 2103/02; C02F 2209/005; C02F 2209/10; C02F 2209/40; C02F 2209/42
See application file for complete search history.

(56) References Cited

U.S. PATENT DOCUMENTS 5,597,487 A * 1/1997 Vogel .................... B01D 61/08
210/411
8,790,513 B1 * 7/2014 Boulter .................... C02F 9/00
210/104
(Continued)

FOREIGN PATENT DOCUMENTS

CN  105231448 A  1/2016
JP   H57897 A    1/1993
(Continued)

OTHER PUBLICATIONS

International Search Report and the Written Opinion for PCT Application No. PCT/US2018/028888; European Patent Office; Rijswijk, Netherlands; dated Jul. 13, 2018.
(Continued)

*Primary Examiner* — Jonathan Miller
(74) *Attorney, Agent, or Firm* — Thomas E. Lees, LLC

(57) ABSTRACT

A system is provided for treating and distributing water. The system includes a first container and an input conduit that supplies water (e.g., purified, unpurified, etc.) to the first container. The system also has a treatment delivery system that delivers a mineral composition into the first container. Further, the system uses a controller to selectively deliver the mineral composition in to the first container so that the mineral composition mixes with, and dissolves in the water delivered to the first container. This produces treated water having a programmed profile, which can be distributed to a destination (e.g., a coffee shop) via an output conduit.

16 Claims, 6 Drawing Sheets

Related U.S. Application Data

(60) Provisional application No. 62/488,849, filed on Apr. 23, 2017.

(51) Int. Cl.
*A47J 31/40* (2006.01)
*C02F 103/02* (2006.01)

(52) U.S. Cl.
CPC .... *C02F 2103/02* (2013.01); *C02F 2209/005* (2013.01); *C02F 2209/10* (2013.01); *C02F 2209/40* (2013.01); *C02F 2209/42* (2013.01)

(56) References Cited

U.S. PATENT DOCUMENTS

| | | | | |
|---|---|---|---|---|
| 10,399,874 B2* | 9/2019 | Lee | | C02F 1/686 |
| 10,589,977 B2* | 3/2020 | Yu | | B67D 1/0014 |
| 10,939,694 B2* | 3/2021 | Minor | | A23L 29/294 |
| 2002/0158018 A1* | 10/2002 | Abramowitz | | C02F 1/4618 |
| | | | | 210/639 |
| 2005/0126199 A1 | 6/2005 | Akkad | | |
| 2009/0283464 A1 | 11/2009 | Oe et al. | | |
| 2010/0300868 A1* | 12/2010 | Pirone | | C02F 9/005 |
| | | | | 202/175 |
| 2011/0100890 A1* | 5/2011 | Brotman | | C02F 9/005 |
| | | | | 210/202 |
| 2012/0285897 A1* | 11/2012 | Fike | | C02F 9/00 |
| | | | | 210/85 |
| 2013/0256238 A1* | 10/2013 | Christy | | C02F 1/68 |
| | | | | 210/205 |
| 2013/0277222 A1 | 10/2013 | Kwon et al. | | |
| 2014/0209544 A1* | 7/2014 | Poffet | | C02F 1/66 |
| | | | | 210/749 |
| 2015/0037463 A1* | 2/2015 | Skovby | | C02F 1/68 |
| | | | | 426/66 |
| 2015/0101984 A1* | 4/2015 | Beeman | | C02F 1/441 |
| | | | | 210/96.2 |
| 2016/0130163 A1* | 5/2016 | Poffet | | C02F 1/44 |
| | | | | 252/387 |
| 2018/0362379 A1* | 12/2018 | Collenot | | C02F 9/00 |
| 2019/0375656 A1* | 12/2019 | König | | B01D 5/0015 |
| 2020/0055753 A1* | 2/2020 | Minor | | C02F 1/68 |

FOREIGN PATENT DOCUMENTS

| | | |
|---|---|---|
| JP | H6178624 A | 6/1994 |
| JP | H9308686 A | 12/1997 |
| JP | 2005046723 A | 2/2005 |
| KR | 1020100076373 A | 7/2010 |
| KR | 1020130062010 A | 6/2013 |
| WO | 9325478 A1 | 12/1993 |
| WO | 02/085794 A1 | 10/2002 |
| WO | 2009/037610 A2 | 3/2009 |
| WO | 2014171812 A2 | 10/2014 |

OTHER PUBLICATIONS

European Examination Report for European Patent Application No. 18723276.4, European Patent Office; Rijswijk, Netherlands; dated Jan. 15, 2021.
Australian Examination Report for Australian Patent Application No. 2018258118, IP Australia; Converga, Level 1, Lakeview House, 236-242 Cowlishaw Street, Tuggeranong ACT 2900; dated Jan. 13, 2023.
Japanese Office Action for Japanese Patent Application No. 2020-507512, Japanese Patent Office, dated Dec. 24, 2021.
Korean Rejection for Korean Application No. 10-2019-7034557, Korean Intellectual Property Office, dated Aug. 9, 2022.

* cited by examiner

WATER TREATMENT SYSTEM

CROSS REFERENCE TO RELATED APPLICATIONS

This application is a bypass continuation of International Application No. PCT/US2018/028888, filed Apr. 23, 2018, entitled WATER TREATMENT SYSTEM, which claims the benefit of U.S. Provisional Patent Application Ser. No. 62/488,849, filed Apr. 23, 2017, entitled DRINK WATER TREATMENT SYSTEM, the disclosures of which are hereby incorporated herein by reference.

BACKGROUND

Various aspects of the present disclosure relate generally to the treatment of water, and more particularly, to systems and processes for treating water with a mineral composition. Further aspects of the present disclosure relate generally to the distribution of the treated water to a desired destination, e.g. to deliver treated drink water for use to brew or otherwise prepare a beverage.

Numerous businesses rely on water to make various types of drinks, including hot beverages and cold beverages. One example of this is a coffee shop. For instance, to make coffee, coffee grounds from coffee beans are mixed with heated (e.g., near-boiling) water. As the heated water is passed through the coffee grounds, flavor is extracted from the oils within the ground coffee beans. After a short steeping period, the coffee grounds are strained out of the mixture using a coffee filter. In this regard, there are several factors that can affect the overall taste of the coffee product. One such factor is the water used to brew the coffee.

BRIEF SUMMARY

According to aspects of the present disclosure, a system is provided, which is utilized for treating and distributing drink water. The system comprises a first container and an input conduit that supplies water (e.g., purified drink water, unpurified drink water, etc.) to the first container. The system also comprises a sensor that measures a characteristic of the water within the first container, and a treatment delivery system that delivers a mineral composition into the first container. Further, the system comprises a controller that controls the treatment delivery system to selectively deliver the mineral composition into the first container based on the characteristic of the water measured by the sensor, such that the mineral composition mixes with and dissolves in the water to produce treated water having a programmed mineral profile. The system yet further comprises an output conduit that distributes the treated water to a destination (e.g., a coffee shop).

According to further aspects of the present disclosure, a process for treating and distributing drink water to a destination is provided. The process comprises supplying water from an input conduit into a first container. The process also comprises taking measurements of a characteristic of the water in the first container by using a sensor. The process yet further comprises delivering, via a controller based on the measurements taken by the sensor, a determined amount of mineral composition via a treatment delivery system, into the first container thus producing treated water, and verifying the amount of mineral composition delivered into the first container. The process still further comprises distributing the treated water to a destination by using an output conduit.

According to yet further aspects of the present disclosure, a system for treating and distributing drink water to a destination is provided. The system comprises a purified water conduit that receives purified water. The purified water conduit comprises a purified water shutoff valve, a purified water total dissolved solids (TDS) sensor that assesses water quality, a purified water flow rate sensor, or any combination thereof. The system also comprises a local water conduit that receives local water. The local water conduit comprises a local water conduit shutoff valve, a bypass conduit, a bypass shutoff valve, a local water TDS sensor that assesses water quality, a local water flow rate sensor, or any combination thereof. Also, the system comprises a mix tank coupled to the local water conduit and the purified water conduit. The mix tank comprises a mix tank TDS sensor, a mix tank shutoff valve, a mix tank pressure sensor, a mix tank pH sensor, a mix tank fill sensor, a mix tank overflow sensor, a mix tank drain, or any combination thereof.

Yet further, the system comprises a component housing coupled to the mix tank for delivering a mineral composition to the mix tank based on measurements taken by at least one of the mix tank TDS sensor and the pH sensor. The component housing comprises a storage compartment, a refill cartridge coupled to the storage compartment, a distribution mechanism that delivers the mineralization composition, a component housing shutoff valve, or any combination thereof.

The system also comprises a shop tank coupled to the mix tank. The shop tank comprises a shop tank TDS sensor, a shop tank shutoff valve, a shop tank pressure sensor, a shop tank pH sensor, a shop tank fill sensor, a shop tank overflow sensor, a shop tank drain, or any combination thereof. The system still further comprises a transfer conduit coupled between the mix tank and shop tank. the transfer conduit can be entirely passive, or the transfer conduit may comprise a transfer conduit shutoff valve, a transfer pump, a filter component, or any combination thereof. Moreover, an output conduit is coupled to the shop tank and a destination, that channels the water from the shop tank to a destination, e.g., utilizing a pump.

DETAILED DESCRIPTION

Figure 1:
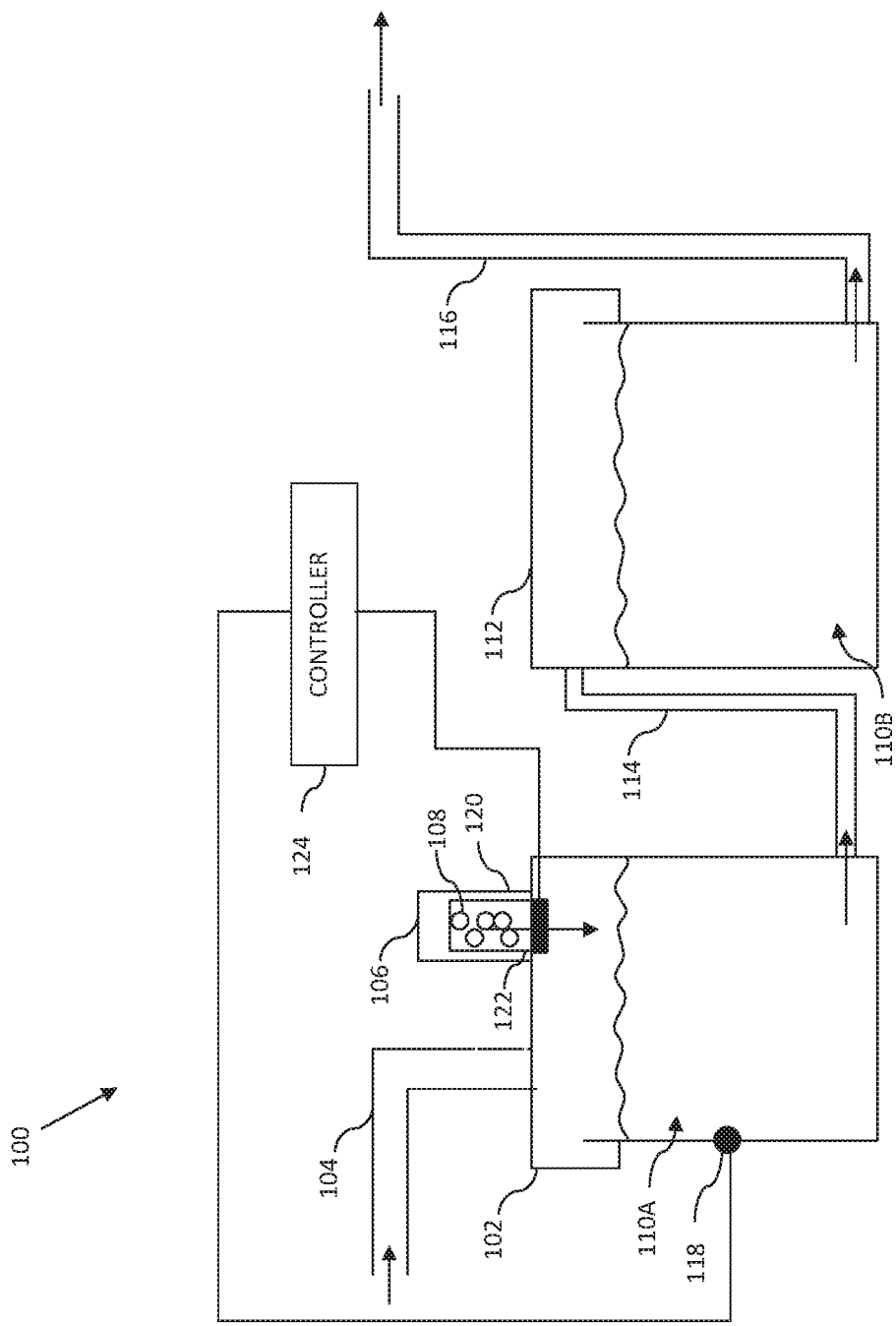
FIG. 1 is a block diagram that illustrates an example system for treating and distributing water, according to aspects of the present disclosure.

Beverage businesses, such as coffee shops, rely heavily on water to conduct their business. In this regard, coffee shops typically have limited choices of water to produce their beverage products, which may be the result of limited water sources in the area. For instance, one option is to utilize water supplied from a locale (e.g., from a city, municipality, well, etc.). While such water sources may be readily available, the supplied water may have undesirable characteristics including undesired particulates, etc., that affect taste. Moreover, a coffee shop cannot typically regulate or control such water supplies. As such, water quality can vary and change from time to time, and even from location to location in the case of chain coffee shops.

Accordingly, coffee shops may utilize filters to improve the overall quality of the water. However, even with filters, an inability to control the source of the water, and hence the effectiveness of such filters is not guaranteed. Moreover, there is no way to tailor the water to have a specific taste profile.

Another option is to purify the water supplied by a locale. For instance, a reverse osmosis (RO) system can be utilized, which uses a semipermeable membrane to remove ions, molecules, and larger particles from water. Unfortunately, processes such as RO can take out desirable particulates such as desired minerals in addition to taking out undesirable particulates. Also, as with filtering, there is no way to tailor the water to have a specific taste profile.

However, according to aspects of the present disclosure, systems and processes are provided that mixes water with a mineral composition that provides a water having a predictable and repeatable mineral composition, and hence, a repeatable mineral profile. This facilitates the ability, for example, for a coffee shop to have water with a consistent and customizable flavor profile. Such an implementation may be beneficial to a franchise that has multiple locations across a wide area, where different water sources may have different water compositions.

The present disclosure is further directed to a system that enables the ability to customize a flavor profile of drink water. Here, the flavor profile is controlled by controlling a ratio of the components in a mineral composition are mixed with drink water such that drink water is consistently customized water to suit intended applications, e.g., based upon a programmed mineral profile. Systems herein expand the number of water options, thus allowing for instance, a beverage provider to tailor drink water to a particular beverage. By way of example, one mineralized water mixture may have a programmed mineral profile that is used for a latte, and another water mixture having a programmed mineral profile that may be more suitable for a cappuccino. Still further, a third mineral profile may be suitable for an expresso drink, etc. Utilization of the systems herein enable the beverage provider with unparalleled options to customize water flavor profile(s) using minerals, which benefits the beverage consumer as well.

Aspects of the current disclosure provide for delivering a mineral composition, which can include mineralizing and/or re-mineralizing water. As an example, aspects of the present disclosure provide for re-mineralizing water, and distributing the re-mineralized water to a destination (e.g., for brewing coffee, tea, other beverages that rely upon water, combinations thereof, etc.). In an example implementation, water, which may be purified (e.g., RO water), is received by an input conduit and is supplied to a first container. A treatment delivery system coupled to the first container releases a mineral composition (e.g., a mineralization composition) that mixes with and dissolves in the water to produce treated water. The delivery of the mineral composition may be programmably controlled based upon a pre-determined mineral profile.

While many exemplary embodiments utilize a single container, the treated water can be optionally transferred from the single container (i.e., a first container) to a second container by utilizing a transfer conduit. During or after the transfer from the first container to the second container, the water may pass through an additional filter to enhance purity of the treated water. Other processing may also be carried out. Once prompted, the treated water in the second container can be transferred to the destination via an output conduit.

According to yet further aspects of the present disclosure, a system is provided for treating and distributing water. The system comprises a (first) container, and an input conduit that supplies water to the first container. The system also comprises a treatment delivery system. The treatment delivery system includes a water treatment storage apparatus that stores a mineral composition, and a treatment distribution system that selectively delivers the mineral composition stored in the water treatment storage system to the first container. The system further comprises an output conduit that distributes treated drink water to a destination.

Still further, the above-system can comprise a controller that controls the distribution system to selectively deliver the mineral composition to the first container so that the mineral composition mixes with, and dissolves in the water delivered to the first container via the input conduit to produce water having a programmed mineral profile that is affected by the mineral composition. For instance, characteristics of the water in the first container (e.g., pH, temperature, total dissolved solids (TDS), combinations thereof, etc.) are measured by one or more sensor(s), which may be present at a desired location, e.g., in the first container, input conduit, combinations thereof, etc. Here, the controller delivers a pre-determined amount of mineral composition via the treatment delivery system into the first container, e.g., based on the measured characteristics of the water by the sensor(s).

The amount of mineral composition delivered into the first container can be verified for accuracy. Assuming the correct mineral composition was delivered, the treated water is distributed to a destination via an output conduit. On the other hand, if the correct mineral composition was not delivered, corrections can be implemented, e.g., via adding additional mineral composition, adding additional water, expelling water, etc., as described more fully herein.

In some embodiments, the system further comprises a second container. Under this configuration, a transfer conduit transfers treated water from the first container to the second container, and the output conduit distributes treated drink water from the second container to a destination. In various implementations, the controller can be further operatively configured to control the transfer of treated water from the first container to the second container. This allows, for instance, the second container to be used as a supply tank while the first container replenishes with water and mixes the mineral composition with the replenished water to derive additional treated water. As such, the system can accommodate peak demands for treated water, which can exceed the ability of a corresponding system to supply water via the first container alone.

Other features, advantages, and objects of the disclosure will become apparent with reference to the following description and accompanying drawings.

Working Examples

Referring now to the drawings and in particular FIG. 1, a system 100 is illustrated for treating and distributing water.

The system 100 illustrates various components that can be combined in any combination of components described with reference thereto. In this regard, not every disclosed component need be incorporated into a system configuration. Accordingly, for purposes of clarity, several example configurations are described below.

First Example System

The system 100 comprises a first container 102 and an input conduit 104 that supplies water (i.e., drink water) to the first container 102. The water supplied to the first container 102 can be purified water, unpurified water, pre-treated water, etc.

For the purposes of this disclosure, purified water is water that has been filtered to remove particulates (e.g., ions, molecules, relatively large particles, contaminates, etc.) from the water. Techniques to filter water include but are not limited to reverse osmosis, filtering (e.g., using pressure, sand, ceramics, paper/cloth materials, carbon filters, or charcoal, etc). Filtering can also be carried out using an energy treatment such as boiling, distillation, or ultraviolet light; and oxidation such as ozone treatment.

Similarly, pre-treated water includes water having additives provided by a local water authority to make public water suitable, e.g., fluoride, chlorine, etc. Techniques to treat water include, but are not limited to chemical treatment such as chlorine, bromine, or organic acids, etc.

The first container 102 is a general-purpose container (e.g., a storage tank) that acts as a temporary mixing and holding area for the water added via the input conduit 104 so that the water may be ultimately treated as described more fully herein. The size and materials of the first container 102 may vary based on the location, geography, and overall demand for water.

In multiple implementations, the input conduit 104 comprises a first input conduit that supplies purified water, and a second input conduit that supplies non-purified water to the first container 102. The non-purified water source can be a backup in case there is an issue with a purified water supply. Such implementations can comprise a total dissolved solids (TDS) meter in-line with one or more input conduits. Moreover, one or more input conduits can comprise a water flow and/or a flowrate valve in-line that measures a flow rate of water passing therethrough.

In an example implementation, the system 100 also comprises a treatment delivery system 106 that delivers a mineral composition 108 into the first container 102. Here, the mineral composition 108 added to the first container 102 mixes with, and dissolves in the water in the first container 102 to produce treated water 110A.

In various implementations, the system 100 further comprises a second container 112 and a transfer conduit 114 that couples the first container 102 to the second container 112. The transfer conduit 114 transfers treated water 110A from the first container 102 to the second container 112, which stores the treated water 110B. In certain implementations, the treated water 110B is the same as the treated water 110A.

In other implementations, the treated water 110B in the second container 112 can be further filtered and/or treated, thus producing a different water composition. For example, an inline filter can be placed within the transfer conduit 114, which filters the treated water 110A as it travels from the first container 102 to the second container 112.

Yet further in such implementations, the system 100 further comprises an output conduit 116 coupled to the second container 112 that distributes treated water 110B from the second container 112 to a destination. Here, the destination will vary based upon the intended application. The destination can be conventional brew equipment (i.e., in the application of a coffee shop), a reservoir, a subsequent location for further processing of the treated the water 110B, etc.

Optional Extensions of the System of Example 1

In various implementations, the system 100 may also comprise a sensor 118 that measures a characteristic of water within the container 102. For the purposes of this disclosure, sensor(s) includes a tool, meter, or mechanism that tracks, records, measures, monitors, and/or transmits a pre-determined variable. Example sensors include a total dissolved solids (TDS) meter, water level sensor, pH sensor, pressure sensor, etc. While only one sensor is illustrated in FIG. 1, in practical implementations, multiple sensors 118 can be utilized throughout the system examples of which are described more fully herein.

For the purposes of this disclosure, a total dissolved solids (TDS) sensor is an instrument that measures the total amount of mobile charged ions, including minerals, salts or metals dissolved in a given volume of water, typically expressed in units of mg per unit volume of water (mg/L), also referred to as parts per million (ppm). In this regard, a TDS measurement result can serve as an assessment of water quality.

A flow rate sensor, as used in this disclosure, is directed to an instrument that monitors, and in some cases moderates, the amount of water being channeled through a corresponding conduit.

In various implementations, the treatment delivery system 106 can include a water treatment storage apparatus 120 and a treatment distribution system 122. The treatment storage apparatus 120 stores a mineral composition 108. This allows for instance, the mineral composition 108 to be replenished, replaced (with the same composition or a different composition, etc.) as needed.

As such, replaceable cartridges or similar devices can be used to store or refill the mineral composition 108 in the water delivery system 106. Where the mineral composition is a powder, the water treatment storage apparatus 120 can comprise an auger or other hardware to prevent clumping that may interfere with proper operation of the system. Also, it may be necessary to prevent moisture from causing caking of the mineral composition. As such, moisture, temperature, humidity, a combination thereof, may need to be monitored, e.g., with a suitable sensor or sensors. Accordingly, the water delivery system 106 itself may be comprised of water or moisture resistant material, have moisture wicking materials, seals, gaskets, etc.

The treatment distribution system 122 delivers the mineral composition 108 stored in the water treatment storage apparatus 120 to the container 102. The treatment distribution system 122 can be as simple as a valve or a port that opens at given intervals to deliver the mineral composition 108 to the first container 102 (i.e. a drop-in delivery mechanism). Mechanisms that the treatment distribution system 122 may use include, but are not limited to a piston delivery mechanism, an auger delivery mechanism, a drop-in delivery mechanism, etc. The treatment distribution system 122 may also use a scale that verifies the amount of mineral composition before the mineral composition is supplied to the first container. Illustrations of various example mechanisms can be viewed in FIG. 6 and associated sub-figures, which are discussed later herein.

In example implementations, the treatment delivery system 122 can be electronically controlled (e.g., by a controller in response to meeting a predetermined condition, threshold, etc., based upon a reading from the sensor 118 as described in greater detail below).

For instance, as schematically illustrated, the system 100 can also comprise a controller 124 that controls the treatment delivery system 106 (e.g., by controlling the treatment distribution system 122) to selectively deliver the mineral composition 108 (e.g., stored in the water treatment storage apparatus 120) to the container 102 so that the mineral composition 108 mixes with, and dissolves in the water to produce treated water 110A. By controlling the specific formula of the mineral composition 108, the water-to-mineral composition 110, or a combination thereof, a programmed mineral profile can be defined that is affected by the mineral composition 108.

In practical implementations, the sensor 118 communicates with the controller 124 to provide one or more inputs that can be evaluated in order to control a mixing operation whereby the mineral composition 108 is added to the water to produce treated water 110A. In certain embodiments, a sensor 118 is not strictly required.

In other embodiments, multiple sensors 118 can be utilized. For instance, a water level sensor, and a TDS meter can be incorporated into the first container 102. These sensors can provide inputs to the controller 124 to affect how and when, etc., the mineral composition 108 is added to the first container 102. Here, optional sensors in the treatment delivery system 106 (e.g., a scale in the treatment distribution system 122) can be used to measure and/or meter the amount of mineral composition delivered to the first container 102. In addition, sensors can be added to the second container 114, which can provide inputs to the controller 124 to affect how and when, etc., the mineral composition 108 is added to the first container 102. The controller and the sensor(s) are described in greater detail herein.

The following is a practical illustration of one scenario of using the system 100. Purified water (e.g., water from an RO system) is supplied to the first container 102 via the input conduit 104. A sensor 118 (e.g., TDS meter) in first container 102 provides total dissolved solid information to the controller 124. Based upon knowing how much water is in the first container 102, as well knowing the TDS meter reading, the controller 124 computes how much mineral composition 108 needs to be delivered into the water by the treatment distribution system 122 to produce the treated water 110A.

In certain embodiments, the treated water 110A can be extracted directly from the first container 102. In other embodiments (e.g., where peak demand may exceed the ability of the source of water to replenish the first container 102), the first container 102 functions as a mix tank. The treated water 110A is moved to the second container 112, which serves as a holding tank so that another batch of treated water can be established in the first container 102.

With the correct amount of mineral composition 108 mixed and dissolved into the water, the treated water 110A moves through the rest of the systems (transfer conduit, etc.) to the destination.

Second Example System

The second example system is directed toward a single container embodiment. While only one container is illustrated, additional containers can be added in analogous fashion to the system 100.

Figure 2:
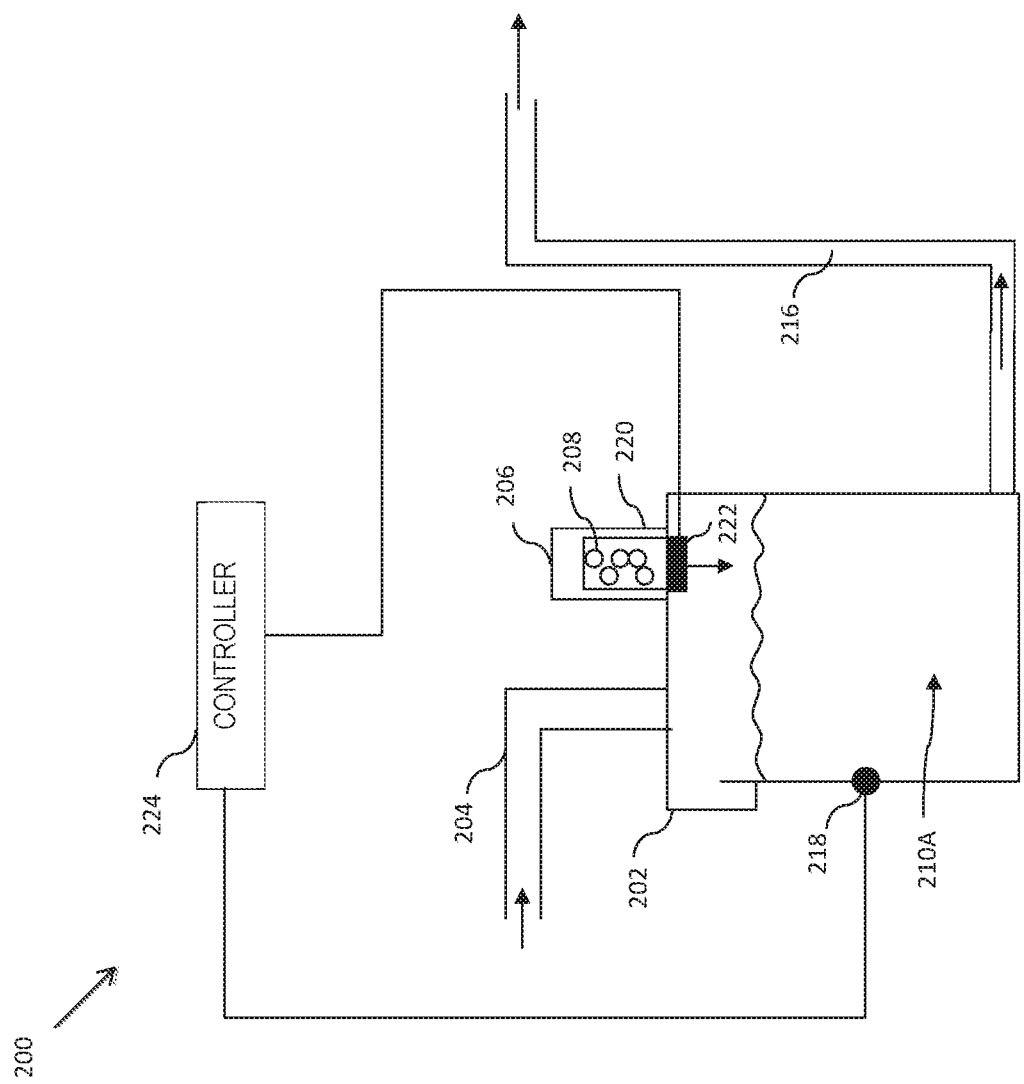
FIG. 2 is a block diagram that illustrates another example system for treating and distributing water, according to aspects of the present disclosure.

Referring to FIG. 2, a system 200 for treating and distributing water is illustrated. The system 200 illustrates various components that can be combined in any combination of components, embodiments, and processes described herein (e.g., system 100). In this regard, not every disclosed component need be incorporated into a system configuration. Accordingly, for purposes of clarity, several example configurations are described below. Moreover, unless otherwise noted, the components, embodiments, and corresponding numbers are identical to those disclosed in FIG. 1, except that the numbers are 100 higher.

The system 200 comprises a container 202 (e.g., analogous to the first container 102 of FIG. 1). The system 200 further comprises an input conduit 204 (analogous to the input conduit 104 of FIG. 1) that supplies water from a water source to the container 202. The water supplied from the water source to the container 202 may be purified, unpurified, pre-treated, local, etc., as described more fully herein.

The system 200 also comprises a treatment delivery system 206 that contains a mineral composition 208 to treat the water.

The apparatus 200 further comprises a sensor 218 that measures a characteristic of water in the container 202. Analogous to the sensor 118 of FIG. 1, the sensor 218 can be a TDS meter, fill sensor, etc.

Moreover, in an example embodiment, the treatment delivery system 206 is illustrated as having a water treatment storage apparatus 220 and a treatment distribution system 222. Analogous to FIG. 1, the water treatment storage apparatus 220 stores the mineral composition 208. The treatment distribution system delivers the mineral composition 208 into the container 202.

Also, the example embodiment comprises a controller 224 (analogous to FIG. 1) that controls the treatment distribution system 222 to selectively deliver the mineral composition 208 to the container 202 so that the mineral composition 208 mixes with, and dissolves in the water to produce treated water 210A having a programmed mineral profile. The treated water may then be distributed to a destination by an output conduit 216.

In an example embodiment, the controller 224 takes the inputs from the sensor 218 (or from multiple sensors), and instructs the treatment distribution system 222 to selectively deliver a specific amount of mineral composition 208. From a practical standpoint, this allows a user to not only produce a certain flavor profile from the water, but also provides an avenue to program (customize) the flavor profile to a specific drink. For example, a first water profile can be established for a light roast coffee, and a second water profile can be established for a dark roast coffee. As another example, different drink types may be customized with different water profiles. For instance, coffee, expresso, and tea may each have a different water profile. This level of customization introduces an entirely new way to enjoy beverages.

Third Example System

Figure 3:
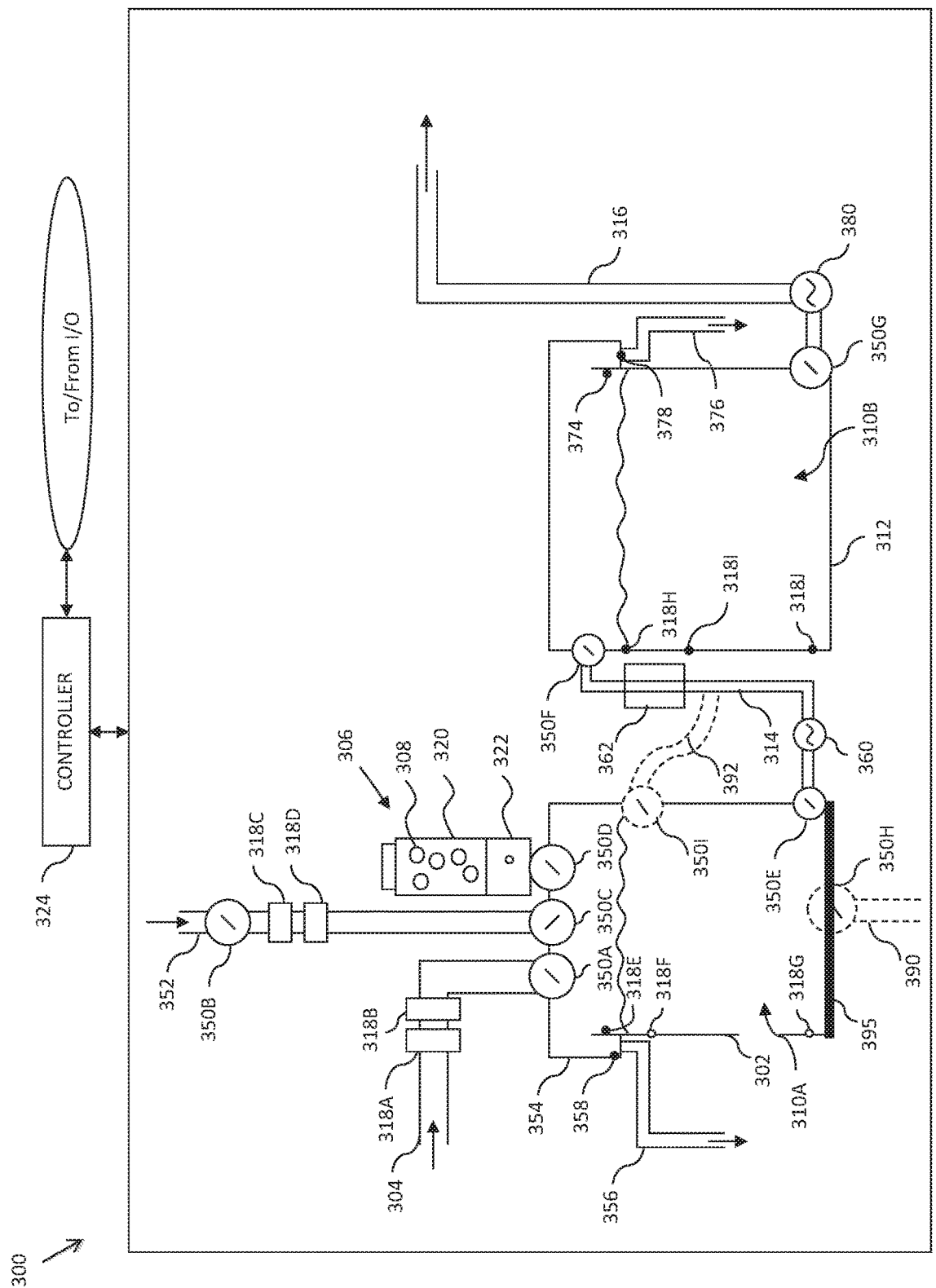
FIG. 3 is a block diagram that illustrates yet another example system for treating and distributing water, according to aspects of the present disclosure.

Referring to FIG. 3, a system 300 is illustrated according to still further aspects of the present disclosure. The system 300 illustrates various components that can be combined in any combination of components described with reference thereto. In this regard, not every disclosed component need be incorporated into a system configuration. Accordingly, for purposes of clarity, several example configurations are described below. Moreover, the system 300 contains and integrates the structures and components from the previous figures. As such, unless otherwise indicated, disclosed components are 200 higher than like components in FIGS. 1 and 100 higher than like components of FIG. 2.

Analogous to that described more fully herein, the system 300 comprises a first container 302 and an input conduit 304 that supplies water to the first container 302. The first container 302 is a general-purpose container (e.g., a mix tank) that acts as a temporary mixing tank to mix water added via the input conduit 304 with a mineral composition as described more fully herein.

In an example implementation, the system 300 also comprises a treatment delivery system 306 that delivers a mineral composition 308 into the first container 302. Here, the mineral composition 308 added to the first container 302 mixes with, and dissolves in the water in the first container to produce treated water 310A.

In an example implementation, the system 300 also comprises a second container 312 and a transfer conduit 314 coupled to the first container 302 and the second container 312, which transfers treated water 310A from the first container 302 to the second container 312, thus storing treated water 310B. In certain implementations, the treated water 310B is the same as the treated water 310A. In other implementations, the treated water 310B in the second container 312 can be further filtered and/or treated, an example of which is described herein.

The system 300 can also comprise an output conduit 316 coupled to the second container 312 that distributes treated water 310B from the second container 312 to a destination. Here, the destination will vary based upon the intended application. The destination can be conventional brew equipment, e.g., in the application of a coffee shop, etc.

The example implementation of the system 300 may also comprise one or more sensors (collectively 318) that measures a characteristic of water. Several example sensors 318 utilized throughout the system 300 are discussed herein.

Also, in an example configuration, the treatment delivery system 306 can include a water treatment storage apparatus 320 and a treatment distribution system 322. The treatment storage apparatus 320 stores a mineral composition 308. The treatment distribution system 322 selectively delivers the mineral composition 308 stored in the water treatment storage apparatus 320 to the container 302.

An example configuration of the system 3.00 can also comprise a controller 324 that controls the system (e.g., the treatment distribution system 322) to selectively deliver the mineral composition 308 (stored in the water treatment storage apparatus 320) to the container 302 so that the mineral composition 308 mixes with, and dissolves in the water delivered to the container 302 via the input conduit 304 to produce treated water 310A. By controlling the specific formula of the mineral composition 308, the water-to-mineral composition 310, or a combination thereof, a programmed profile can be defined that is affected by the mineral composition 308.

Fourth Example System

In a particular embodiment, the input conduit 304 functions as a first input conduit and is coupled to a purified water source (e.g., from an RO system). In this regard, the system 300 includes a first sensor 318A, e.g., a TDS meter in-line with the input conduit 304. The use of a TDS meter in-line in the input conduit 304 can serve as an indicator as to whether the incoming RO water is suitable or within predefined parameters. Also, a second sensor 318B implemented as a flowrate sensor can be included in-line with the input conduit 304 to monitor the flow of water through the input conduit. Also, a first valve 350A can be utilized to control the flow of water into the first container 302 form the first conduit 304. The first valve 350A can be a manual valve or the first valve 350A can be controlled by the controller 324.

In various implementations, a second input conduit 352 can also be provided. The secondary input conduit 352 provides a backup (e.g., via a local water source) in case the purified water is unavailable. To this end, the secondary input conduit 352 can include an upstream valve 350B and a downstream valve 350C, which can be manual or controlled by the controller 324 to select the secondary input conduit 352 as the source to fill the first container 302.

Analogously to the first input conduit 304, the second input conduit 352 includes a first sensor 318C, e.g., a TDS meter in-line with the secondary input conduit 352. The use of a TDS meter in-line in the secondary input conduit 352 can serve as an indicator as to whether the incoming water is suitable or within predefined parameters. Also, a second sensor 318D implemented as a flowrate sensor can be included in-line with the secondary input conduit 352 to monitor the flow of water through the input conduit.

Also, as illustrated, the delivery of the mineral composition 308 by the treatment delivery system 306 can be controlled by the controller 324 via a delivery control valve 350D.

In example implementations, the first container 302 can optionally comprise multiple sensors 318, including a float sensor 318E, a first mix tank TDS meter 318F and a second mix tank TDS meter 318G. Having multiple TDS meters allows more precise measurement, especially when the size of the first container 302 is relatively large (e.g., 5-10 gallons or larger, or approximately 19-38 liters or larger).

The first container 302 can also comprise an overflow reservoir 354 that can be used to drain water via a drain 356. An overflow control 358 can be controlled by the controller 324 to open the drain 356, e.g., where it becomes necessary to allow water to drain out of the first container 302. While the drain 356 and associated components are illustrated in the upper half of the first container 302, the drain 356 and associated components may also be in the lower half of the first container 302. For example, the first container 302 may comprise (in addition to, or in lieu of the drain 356) a drain 390, which may optionally have its own drain valve 350H that can be controlled by the controller 324. Here, the drain 390 can be used to flush the container contents, e.g., for cleaning, to dump a batch that is of a composition that cannot be corrected, etc.

In yet further example configurations, the first container 302 can comprise a transfer valve 350E that enables access to the transfer conduit 314 to be opened and closed.

The transfer conduit 314 can include an optional pump 360 to pump treated water from the first container 302 to the second container 312.

An optional filter 362, e.g., a carbon filter may optionally be placed in-line in the transfer conduit 314, e.g., to capture any remaining undesired particulates.

The second container 312, which functions as a holding tank, can include analogous sensors, valves, drain systems, combination thereof, etc., as the first container 301, which functions as a mixing tank.

In an example implementation, the second container 312 comprises a float valve 318H, a first TDS meter 318I, a second TDS meter 318J, an input valve 350F, and an output valve 350G. The second container 312 can also comprise an overflow reservoir 374 that can be used to drain water via a drain 376. An overflow control 378 can be controlled by the controller 324 to open the drain 376, e.g., where it becomes necessary to allow water to drain out of the mix tank.

Analogous to the transfer conduit 314, the output conduit 316 can comprise a pressure pump 380 to pump the treated water to a destination.

In certain embodiments, additional structures may be included, e.g., to provide agitation of the mineral composition, etcetera. For instance, as illustrated an agitator 395 can be optionally provided to agitate the minerals added to the drink water. Once thoroughly mixed, agitation may not be required for prolonged periods, e.g., 30 days or longer. As such, agitation may only be necessary (if at all) during a mix stage performed by the controller 324. In practice, the agitator 395 or variant thereof (e.g., shaker, mixer, stirrer, etc.) can likewise be included in any of the alternative embodiments herein, e.g., as described with reference to FIG. 1 or FIG. 2.

In certain embodiments, e.g., where agitation is not necessary, a passive conduit 392 can be used to transfer treated water from the first container 302 to the second container 312 in place of the transfer conduit 314 (which can utilize the optional pump 360 to transfer the treated water into the second container 312) as shown in FIG. 3. For instance, as illustrated, an example passive conduit 392 (where utilized) can directly couple the first container 302 to the second container 312. While the passive conduit 392 is shown with a curved geometry, any suitable geometry may be used. Further, the passive conduit 392 can optionally include a valve 350I that can be operated by the controller 324.

Inputs/Outputs

In practical implementations, the one or more sensors (collectively 318), valves (collectively 350), pumps 360, 380, agitators 395, any motors, augers, actuators, etc. within the treatment delivery system 308, sensors within the treatment delivery system 308, combinations thereof, etc., communicate with the controller 324 to provide one or more inputs and/or outputs (I/O) that can be evaluated to control a mixing operation whereby the mineral composition 308 is added to the water to produce treated water 310A. In this regard, wired connections to and from the controller 324 are omitted from FIG. 3 for clarity of illustration. In certain embodiments, a sensor 318 is not strictly required. In other embodiments, multiple sensors 318 can be utilized.

Controller

Figure 4:
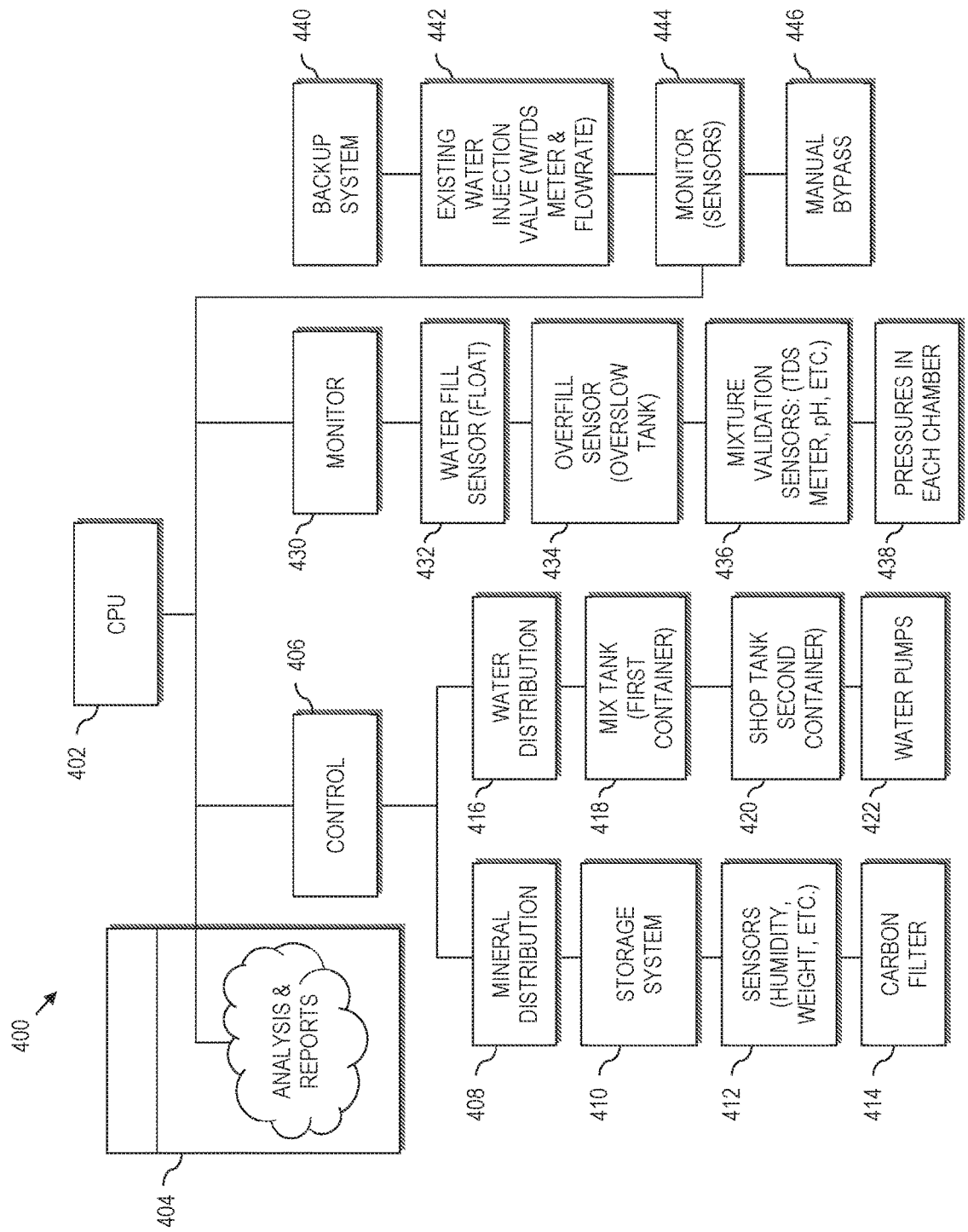
FIG. 4 is an example block diagram of a controller that can be used to control any of the systems disclosed more fully herein.

Referring to FIG. 4, a controller block diagram is illustrated according to aspects of the present disclosure. The controller 400 illustrates various components that can be combined in any combination of components described with reference thereto. In this regard, not every disclosed component need be incorporated into a system configuration. Accordingly, for purposes of clarity, several example configurations are described below.

The controller 400 comprises a CPU 402, e.g., any suitable processor. An optional transceiver enables communication to a remote system, such as a cloud-based system 404 to administer reports, analytics, etc. This allows a way to track not only the health of the system, but also to monitor the quality and consistency of the water by preserving the sensor readings.

The controller 400 can include a control branch 406. The control branch 406 includes the algorithms to control water treatment/mineral distribution at 408 (i.e., to control the release of the mineral composition into the first container/mix tank by communicating with the treatment distribution system and/or the treatment delivery system).

The control branch 406 can also control the mineral composition storage system (e.g., which can be implemented as a cartridge system, etc.), by controlling the water treatment storage apparatus and/or the treatment delivery system. Here, the controller can detect when a mineral composition needs replaced/refilled, can select a particular mineral composition, etc., according to a programmed configuration.

The control branch 406 also includes algorithms to read the various sensors at 412 as set out more fully herein, e.g., to read any combination of I/O components as set out in FIG. 3.

As another option, the control branch 406 can include an algorithm to monitor a filter (e.g., a carbon filter 414) in the transfer conduit (where utilized).

Also, the control branch 406 can include algorithms to control the water within the system, e.g., via a water distribution algorithm 416 that controls the flow of water through the system, e.g., via a mix tank (first container).

A water control algorithm 418 can control water level, mixture of the mineral composition with the water, or both.

A shop/storage tank (second container) water control algorithm 420 can control water level, replenishment, etc., into the second container.

A control algorithm 422 can control any utilized pumps to control the flow of water into the first container, out of the first container and into the second container, and out of the second container to a destination.

A monitor control branch 430 provides algorithms that monitor the state of the system. The monitor control branch 430 includes algorithms that react to sensor readings. As a few illustrative examples, the monitor control branch can include a water fill sensor algorithm 432 that compares water fill levels to pre-programmed levels. Having a known volume of water in the mix tank can be utilized for instance, to ensure that the mineral composition is administered in the correct quantity for the given volume of water in the mix tank. Also, knowing the water level in the shop tank/storage tank (i.e., second container) is helpful to predict whether there is enough water available for peak demand. Notably, it may take a long time to refill the mix tank, such as where the mix tank is filled with RO water due to the delay and slow reverse osmosis process.

The monitor control branch 430 can also include an overfill algorithm 434 to control the drains where necessary to maintain the tanks.

The monitor control branch 430 can also include a mixture validation algorithm 436 that can validate, e.g., using the TDS meters in the mix tank and/or storage tank, that the mixture in the mix tank is being performed correctly. Algorithms can also be provided to check the pH, etc., against predetermined thresholds.

The monitor control branch 430 can also include a pressure algorithm 438 to verify that the pressure in the mix tank, shop tank, or both are within predetermined ranges.

The controller 400 can also include a backup control system 440. The backup control system 440 includes an algorithm 442 to control backups for existing water injection valves, meters, sensors, pumps, etc. Here, the backup control system 440 can monitor sensors 444, etc., to determine a state of health of the sensors, and switch to backups as necessary.

The backup control system 440 can also comprise a manual bypass 446 that allows the backup system to respond to issues, e.g., for planned maintenance, to address malfunctions, etc.

In practice, the controller 400 can include any combination of features described above. Moreover, the controller 400 is suitable to carry out the functionality of the controller 124 (FIG. 1), controller 224 (FIG. 2), controller 324 (FIG. 3), etc. Moreover, the controller 400 can carry out the operations and any combination of processes disclosed herein, including the process of FIG. 5 or any sub combination thereof.

Mineral Composition

As noted more fully herein, a treatment delivery system selectively delivers a mineral composition into a container to achieve a desired and/or programmed mineral profile. The profile of the mineral composition 108, 208, 308, etc., may vary based on the overall chemistry of the source water added to the container. In one example embodiment, the mineral composition comprises chemicals such as sodium, chloride, potassium bicarbonate, magnesium, or calcium. In another embodiment, the composition may include other additives and molecules such as electrolytes.

Example mineral compositions re-mineralize the water. The mineral compositions described herein are particularly well suited for applications such as brewing coffee, because flavor of the coffee is rendered consistent, and in many cases improved for a brew that is prepared using a disclosed mineral composition. It has been surprisingly found that in the application of coffee brewing, there must be a mineral content in the brewing water to get a flavorful coffee. A mineral composition as set out herein, can be implemented to re-mineralize brewing water to achieve desired mineral concentrations. For instance, in some embodiments, the re-mineralization is calibrated to satisfy best-practice specifications of the Specialty Coffee Association of America. In additional and/or alternative embodiments, the re-mineralized water provides a general-purpose water that can be used to prepare beverages other than coffee, including tea, beer and other water-based beverages.

As such, the mineral compositions herein, can be utilized for purposes of re-mineralizing water. In this regard, as used herein, the term "re-mineralized" includes mineralizing, increasing mineral content, re-mineralizing, or otherwise altering the mineral content of corresponding water. The mineral compositions herein are expressly not for fortifying nutrition (e.g., vitamin, and mineral supplements), for providing a synthetic substitution of natural ingredient (e.g., such as sugar), or for defining the drink beverage itself (e.g., such as ready to drink mixes).

Example Mineral Content

Moreover, the mineral composition described herein can be admixed to a specific composition that takes into account the source of the water before re-mineralization. For example, the mineral content of water distilled at one location may be different from the mineral content of water distilled at another location. As such, a specific mineral composition can be tailored for the distilled water at each location to obtain consistent water, e.g., the most flavorful coffee at each location, etc.

The disclosure herein provides a number of embodiments or examples for implementing different features of various embodiments. Specific examples of components and arrangements are described to simplify the present disclosure. These are merely examples and not intended to be limiting.

In many embodiments, all percentages and ratios are calculated by weight. Also, unless otherwise indicated, all percentages and ratios are based on the total composition.

As used herein, the term "reference amount of water", means that amount of water designated for an associated individual treatment, e.g., amount of water in the first container. In practical applications, a reference amount of water is an easily identifiable and measurable quantity of water.

As used herein, the term "effective amount" means an amount of an ingredient or a mixture sufficient to re-mineralize a reference amount of water.

As an example, an effective amount can comprise an amount necessary to produce a described result, an equivalent thereof, or reasonable approximation of the result. For instance, in many embodiments, especially where the result may be characterized as subjective or arguably subjective (e.g., quality of taste), an effective amount is an amount sufficient to bring about a scientifically objective measurable change described by an associated result.

A mineral composition according to certain embodiments, which is added to water provides water that has a specified balance of minerals, e.g., calcium, magnesium, and optionally sodium, to provide a consistent beverage. That is, by re-mineralizing water to a consistent level of minerals, water variability is eliminated, which could otherwise affect beverage consistency. Moreover, in many embodiments, the result is a flavorful beverage. In certain embodiments, the ingredients are limited to only those minerals that contribute to a beneficial water without providing any ingredients that may be detrimental to the perceived flavor, that can lead to potential claims of detriment to nutrition or detriment to health, etc.

In certain embodiments, the drink water treatment composition includes calcium, magnesium, and sodium. In further embodiments, the drink water treatment composition consists of (is solely formed by) calcium and magnesium (or an equivalent such as calcium chloride). In further example implementations, the drink water treatment composition consists of (is solely formed by) calcium, magnesium (or an equivalent such as calcium chloride), and sodium. In yet further example implementations, the drink water treatment composition consists of (is solely formed by) calcium, magnesium (or an equivalent such as calcium chloride), and potassium (e.g., potassium bicarbonate).

In this regard, all of the ingredients contribute to the effect (e.g., improved flavor) of the treated drinking water. That is, no ingredient is provided solely for an ancillary reason (e.g., as a preservative, or serving some role not desired to be present in the drinking water).

Here, the calcium can be provided as an anti-caking, anti-clumping ingredient to enable the magnesium to be ground down to a suitable size. Also, other ingredients may be added and/or substituted. By way of example, the magnesium can be replaced by an amount of calcium chloride. In this regard, calcium citrate may be preferred over calcium chloride and/or calcium bicarbonate, each of which can have arguably a detrimental effect to the subjective attributes desired in coffee brewing water. For instance, calcium chloride can cause clumping or the formation of clumps/balls of different sizes that may adversely affect certain process. Calcium silica can alternatively be used in place of calcium citrate. However, calcium silica may be deemed undesirable due to the potential for health concerns over its use.

It has been discovered that a mineral composition herein, is water-stable, in that there is no visible sediment or hazing of the water. In certain embodiments, water treated with the mineral composition herein can sit without stirring, shaking, or other agitation. In this regard, such water treated with the mineral composition herein has been observed to sit at rest for over 30 days without any signs of sediment, hazing, or other visible signs of treatment composition falling out of solution in a reference amount of water.

A general example is presented for clarity of understanding aspects of the present disclosure. In an example implementation, magnesium is ground down to a desired average particle size, e.g., a particle size of approximately 200 micrometers or less. With a known quantity of magnesium ground, an amount of calcium citrate and sodium are computed to achieve a desired set of ratios. For instance, an example individual treatment suitable for treating 10 gallon of distilled or deionized water is 11,000 milligrams of magnesium, 3,000 milligrams of calcium citrate, and 1,000 milligrams of sodium chloride. In practical applications however, the calcium citrate can be in the range of 15% up to 20%. However, the percentage of calcium citrate can extend up to the soluble limit of the calcium citrate given the reference amount of drinking water in the first container. In this regard, the soluble limit is temperature dependent, and accordingly, the temperature and volume of drinking water will affect the upper limit of calcium citrate. The calcium citrate, when acting as an anti-caking agent in addition to a mineralizing agent, adds bulk, but does not significantly affect TDS. As such, the calcium citrate can be added in an amount effective to cause the mixture to not cake, clump or otherwise form drastically varying particle sizes that adverse small packaging efforts.

Example 1: Drink Water Treatment Composition

A drink water treatment composition comprises a first edible, water-soluble salt (e.g., a calcium salt such as calcium citrate) that has a weight between about 15% and about 25% by weight of the composition, a second edible, water-soluble salt (e.g., magnesium salt such as magnesium sulfate) that has a weight between about 65% and about 75% by weight of the composition and in admixture with the first edible, water-soluble salt, and a third edible, water-soluble salt (e.g., sodium chloride, potassium bicarbonate salt, a combination thereof, etc.) that has a weight between about 5% and about 10% by weight of the composition and in admixture with the first and second edible, water-soluble salts. The mixture of the first, second, and third edible, water-soluble salts is selected to be an effective amount to be mixed and dissolved in a reference amount of drinking water in the first container to re-mineralize the drinking water for human ingestion.

In some embodiments, the first edible, water-soluble salt comprises calcium citrate, the second edible, water-soluble salt comprises magnesium sulfate, and the third edible, water-soluble salt comprises sodium chloride. In some embodiments, the calcium citrate has a weight greater than 15% by weight of the composition. In some embodiments, the calcium citrate has a weight greater than 15% by weight of the composition, and less than the water solubility limit of calcium citrate as determined by a volume of the reference amount of drinking water. In some embodiments, the magnesium sulfate has a weight that is greater than 70% by weight of the composition, and the sodium chloride (and/or potassium bicarbonate) has a weight that is less than about 10% by weight of the composition.

In some embodiments, each of the first edible, water-soluble salt, the second edible, water-soluble salt, and the third edible, water-soluble salt has an average particle size between about 50 micrometers and 200 micrometers. In some embodiments, the mixture of the first edible, water-soluble salt, the second edible, water-soluble salt, and the third edible, water-soluble salt is mixed and dissolved in the reference amount of drinking water to re-mineralize the drinking water for human ingestion such that the re-mineralized drinking water has a total dissolved solids (TDS) from about 75 milligrams/liter to about 250 milligrams/liter, e.g., a TDS of about 150 milligrams/liter in a specific example embodiment.

Example 2: Drink Water Treatment Composition

A drink water treatment composition comprises an edible, water-soluble calcium salt that has a weight between about 15% and about 25% by weight of the composition, an edible, water-soluble magnesium salt that has a weight between about 65% and about 75% by weight of the composition and in admixture with the calcium salt, and an edible, water-soluble sodium salt that has a weight between about 5% and about 10% by weight of the composition and in admixture with the calcium salt and the magnesium salt. The mixture of the calcium salt, the magnesium salt, and the sodium salt is packaged in an effective amount to be mixed and dissolved in a reference amount of drinking water to re-mineralize the drinking water for human ingestion.

In some embodiments, the calcium salt comprises calcium citrate, the magnesium salt comprises magnesium sulfate, and the sodium salt comprises sodium chloride.

In some embodiments, the calcium citrate has a weight that is about 20% by weight of the composition, the magnesium sulfate has a weight that is about 70% by weight of the composition, and the sodium chloride has a weight that is about 10% by weight of the composition. In some embodiments, each of the edible, water-soluble salts has an average particle size between about 50 micrometers and 200 micrometers.

In some embodiments, the mixture of the edible, water-soluble salts is mixed and dissolved in the reference amount of drinking water to re-mineralize the drinking water for human ingestion such that the re-mineralized drinking water has a total dissolved solids (TDS) from about 75 milligrams/liter to about 250 milligrams/liter. As with the previous example, a TDS measurement represents the total concentration of dissolved substances in the water, which can include minerals, salts, and other solids. The amount and type of solids that are dissolved in the water will affect its flavor.

Example 3: Drink Water Treatment Composition

In an example implementation, a drink water treatment composition consists of calcium citrate that has a weight of about 20% of the weight of the composition, magnesium sulfate that has a weight of about 73% of the weight of the composition and in admixture with the calcium citrate, and sodium chloride that has a weight of about 7% of the weight of the composition and in admixture with the calcium citrate and the magnesium sulfate. The mixture of the calcium citrate, the magnesium sulfate, and the sodium chloride is presented in an effective amount to be mixed and dissolved in a reference amount of drinking water to re-mineralize the drinking water for human ingestion. The mixture of the calcium citrate, the magnesium sulfate, and the sodium chloride is packaged in an effective amount to be mixed and dissolved in a reference amount of water to re-mineralize the water for human ingestion.

In some embodiments, each of the calcium citrate, the magnesium sulfate, and the sodium chloride has an average particle size between about 50 micrometers and 200 micrometers.

In some embodiments, the mixture of the calcium citrate, the magnesium sulfate, and the sodium chloride is mixed and dissolved in the reference amount of water to re-mineralize the water for human ingestion such that the re-mineralized water has a total dissolved solids (TDS) from about 75 milligrams/liter to about 250 milligrams/liter. In some embodiments, the mixture of the calcium citrate, the magnesium sulfate, and the sodium chloride is mixed and dissolved in the reference amount of water to re-mineralize the water for human ingestion such that the re-mineralized water has a TDS of about 150 milligrams/liter.

Method of Making a Mineral Composition

A method of making a mineral composition is provided. The method comprises admixing calcium citrate, magnesium sulfate, and sodium chloride in an effective amount to be mixed and dissolved in a reference amount of water to re-mineralize the water for human ingestion.

In some embodiments, admixing includes admixing calcium citrate having a weight between about 15% and about 25% by weight of the composition, magnesium sulfate having a weight between about 65% and about 75% by weight of the composition, and sodium chloride having a weight between about 5% and about 10% by weight of the composition.

In some embodiments, admixing includes admixing calcium citrate having a weight that is about 20% by weight of the composition, magnesium sulfate having a weight that is about 70% by weight of the composition, and sodium chloride having a weight that is about 10% by weight of the composition.

In some embodiments, admixing includes admixing calcium citrate having a weight of about 300 milligrams, magnesium sulfate having a weight of about 1100 milligrams, and sodium chloride having a weight of about 100 milligrams.

In some embodiments, the method further comprises grinding calcium citrate to an average particle size between about 50 micrometers and 200 micrometers, grinding magnesium sulfate to an average particle size between about 50 micrometers and 200 micrometers, and grinding sodium chloride to an average particle size between about 50 micrometers and 200 micrometers.

In some embodiments, the edible, water-soluble salt comprises magnesium. The method further comprises grinding the magnesium to an average particle size less than 200 micrometers, and then mixing the calcium in an effective amount with the ground magnesium to prevent clumping and caking of the mixture.

In some embodiments, the edible, water-soluble salt comprises calcium chloride. The method further comprises grinding the calcium chloride to an average particle size less than 200 micrometers, and then mixing the calcium in an effective amount with the ground calcium chloride to prevent clumping and caking of the mixture.

In some embodiments, the calcium comprises at least one of calcium citrate, calcium chloride, and calcium carbonate.

In some embodiments, admixing calcium with an edible, water-soluble salt, comprises grinding an amount of the edible, water-soluble salt implemented as magnesium, measuring the amount of magnesium, calculating an amount of calcium implemented as calcium citrate to backfill into the measured amount of magnesium to provide anti-caking, adding the calculated amount of calcium citrate to the measured amount of magnesium, and dividing the measured amount of magnesium to achieve a desired predetermined average total dissolved solids (TDS) per dose.

In some embodiments, admixing calcium with an edible, water-soluble salt, comprises calculating an amount of sodium to backfill into the measured amount of magnesium, and adding the calculated amount of sodium to the measured amount of magnesium.

In some embodiments, the method further comprises grinding the magnesium to a particle size small enough such that when combined with calcium citrate, and applied to the reference amount of water selected from at least one of deionized water, distilled water, and a combination thereof, the water can sit for days, e.g., at least 30 days with no visible signs of sediment of clumping in the water.

Miscellaneous

Although the above description describes mineral compositions for a coffee-brewing application, it is conceivable that a mineral composition be provided for other applications. Other example applications include tea brewing and beer brewing.

Further, although the above description describes a mineral composition being used in a combination of deionized water and distilled water, it is conceivable that a mineral composition can be used to treat other types of water in need of being re-mineralized. For example, a mineral composition can be used to treat water that has been purified using reverse osmosis. The mineral composition can be used to treat any combination of purified waters which need to be re-mineralized to provide brewing water for making a flavorful beverage such as coffee.

Example Process for Treating and Distributing Water to a Destination

Figure 5:
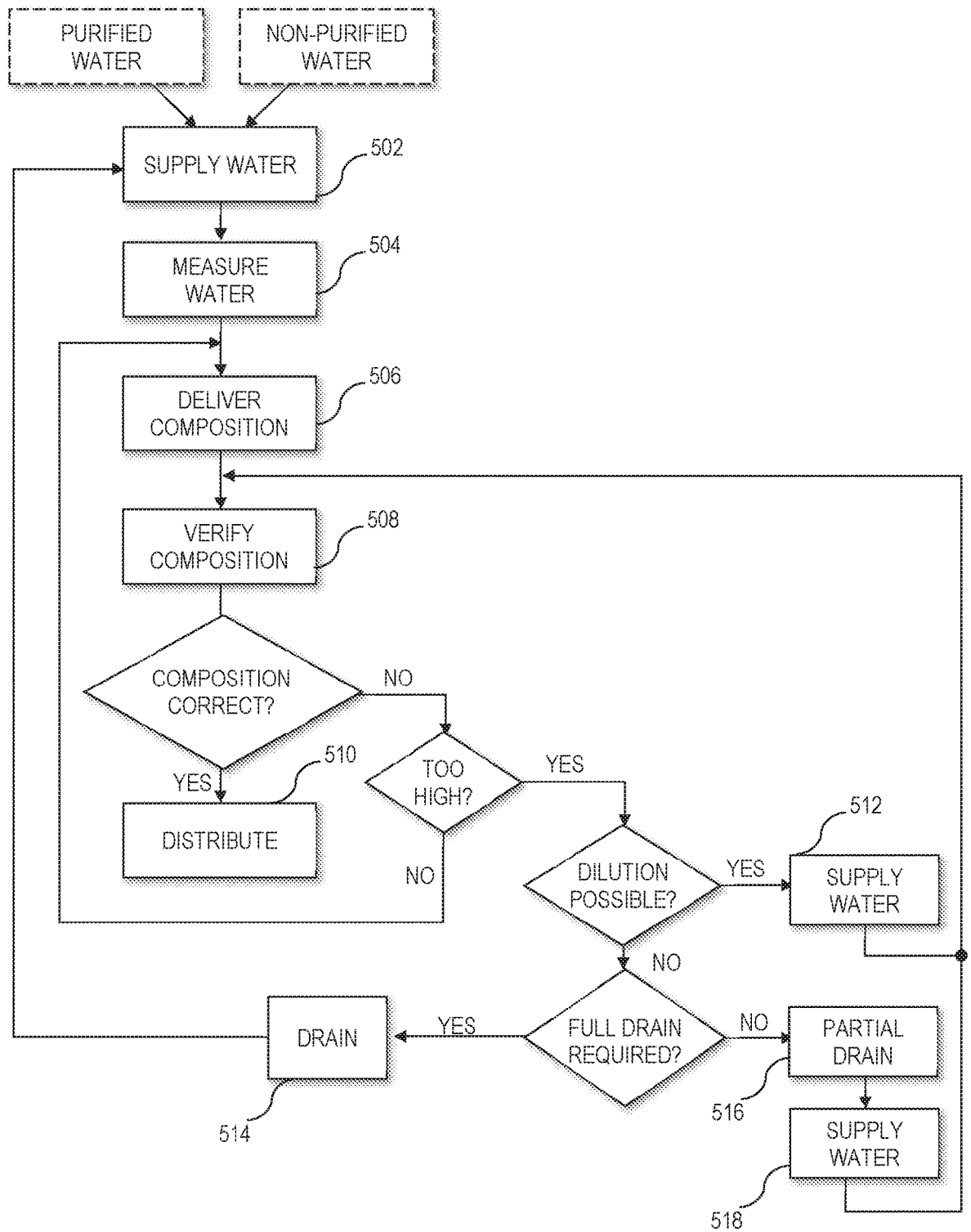
FIG. 5 is a flow chart that illustrates a process of the present disclosure.

Referring to FIG. 5, a process 500 is illustrated for treating and distributing water to a destination. The process 500 can be utilized with any combination of structures, components, embodiments, etc. described above with reference to FIG. 1-FIG. 4. In this regard, the implementation of the process 500 is not limited to the example embodiments, which are discussed for purposes of illustration, not limitation.

The process 500 comprises supplying at 502 water from an input conduit into a first container. In one embodiment, a single input conduit is used to supply water from a particular source to the container. Alternatively, multiple input or conduits may be used to supply water to the first container. Moreover, a controller (e.g., controller 400 FIG. 4) can control the supply of water at 502 to fill the first container to a predetermined level, e.g., ½ full, ¾ full, etc.

In various embodiments, the water that is supplied to the container is purified water. Purification may be achieved using one of the previously disclosed techniques. In alternate embodiments, a second input conduit that supplies non-purified, or local water from a city, municipality, or a third party into the first container can be used.

The process 500 further comprises measuring at 504 a characteristic of the water in the first container by using a sensor. A multitude of tools, sensors, meters, or mechanisms ("sensors") are available to measure a given characteristic of water. A few examples include TDS meters, pH meters, fluid level sensors, chemical specific meters and sensors (e.g., chlorine), pressure sensors, and temperature sensors, as described more fully herein.

The process 500 further comprises delivering at 506, via a controller based on the measurements taken by the sensor, a pre-determined amount of mineral composition via a treatment delivery system, into the first container thus producing treated water. Multiple suitable mechanisms exist to deliver 506 the mineral compositions. In various embodiments, delivering 506 the mineral composition via a treatment delivery system can be accomplished by at least one of a piston delivery mechanism, an auger delivery mechanism, and a drop-in delivery mechanism.

In other embodiments, delivering 506 the mineral composition via a treatment delivery system can be accomplished by weighing the pre-determined amount of mineral composition on a scale before delivery of the mineral composition into the first container.

The controller reads the inputs from the instruments and sensors, and then instructs the delivery mechanism for the mineral composition to deliver a pre-determined amount of the mineral composition into the container. The overall composition and ratio of the mineral composition will vary based on the condition and physical attributes of the water, including whether the water is purified or local. In one embodiment, the mineral composition comprises sodium, chloride, potassium bicarbonate, magnesium, calcium, or a combination thereof, as set out more fully herein. In addition, the composition and ratio of the mineral composition can be programmed to meet specific profiles as previously disclosed herein.

Optionally, the mixture may need to be agitated to adequately mix the delivered mineral composition with the water. In an example, agitation is carried out until the minerals disperse in the water with no signs of clumping or haze.

Further, the process 500 comprises verifying at 508 the amount of mineral composition delivered into the first container. An example implementation verifies at 508, the amount of mineral composition delivered into the first container through use of TDS sensor (or sensors), and optionally, one or more water level sensors. If the amount of mineral composition delivered to the first container is correct (i.e., meets the concentration or ratio of water to mineral composition), then the treated drink water is ready to be distributed (see 510).

If, however, the amount of mineral composition delivered to the first container is incorrect, the process 500 performs various actions based on whether the amount of mineral composition exceeds the pre-determined amount (i.e., a first action), or is below the pre-determined amount (i.e., a second action).

For instance, if the amount of mineral composition is below the pre-determined amount, the process 500 may instruct the controller to add additional mineral composition into the first container via the treatment delivery system. The process 500 can repeat delivery at 506 and verification at 508 of the mineral composition until the amount of mineral composition delivered 508 to the first container is correct.

If the amount of mineral composition exceeds the pre-determined amount, it may be possible to dilute the existing water supply to make the mineral composition meet the pre-determined amount. In such instances, water can be supplied 512 (e.g., by the input conduit), verified 508 and distributed 510.

If the amount of mineral composition exceeds the pre-determined amount, and dilution is not possible (e.g., not enough volume in the first container to add water for dilution) then the system 500 can instruct the controller to drain a pre-determined amount of treated water from the first container via a drain. Depending on how far the mineral composition exceeds the pre-determined amount, the entire first container may need to be drained (see 514). In such an instance, the process 500 effectively resets and starts over. Alternatively, it may be possible to partially drain 516 the first container, and then supply 518 water into the first container, and verify 508 the amount of mineral composition in the first container.

The process 500 also comprises distributing at 510, water to a destination. Water can be distributed using an output conduit that distributes the treated water from the first container to the destination. In one such embodiment, a mechanical pump can be used to distribute the water. In an alternate embodiment, a second container is introduced. The treated water is transferred from the first container to the second container by a transfer conduit. The second container may function as storage for the treated water so that the system can handle a higher volume of use. In various embodiments, the transfer conduit can use a mechanical pump to transfer the water from the first container to the second container.

Yet further in this embodiment, the transfer conduit utilizes a filter component to capture remaining particulates as the water transfers from the first container to the second container. Filtration methods and sensors are described more fully herein.

Delivery Mechanisms

FIGS. 6a-6d briefly illustrate embodiments that can be used with a treatment delivery system that is used for the various systems and processes disclosed herein. Each FIGURE has been simplified for clarity purposes (i.e., no controller is shown, and only the system 100 reference numbers are used), so they are by no means limiting. FIGS. 6a-6d may incorporate any or all of the disclosed contained herein where applicable.

Figure 6A:
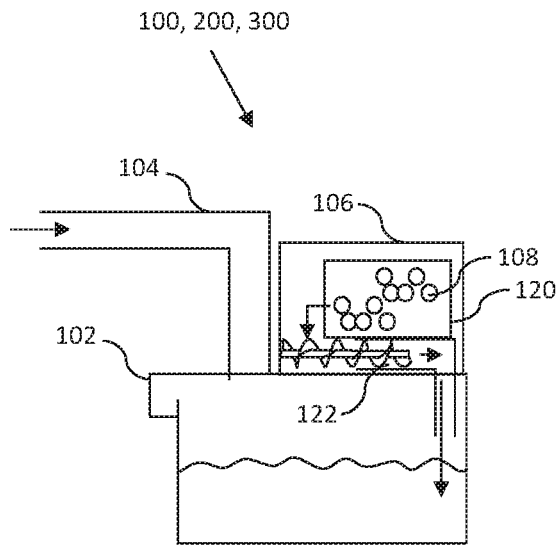
FIG. 6A to FIG. 6D schematically illustrate example treatment delivery system configurations, according to various aspects of the present disclosure.

FIG. 6a illustrates an embodiment of the treatment delivery system 106 where the treatment distribution system 122 utilizes an auger to mix and deliver the mineral composition 108. As disclosed herein, the mineral composition 108 depending on its composition may clump. Thus, the auger may be an effective solution to mitigate such clumping. The remaining reference numbers are shown for context.

Figure 6B:
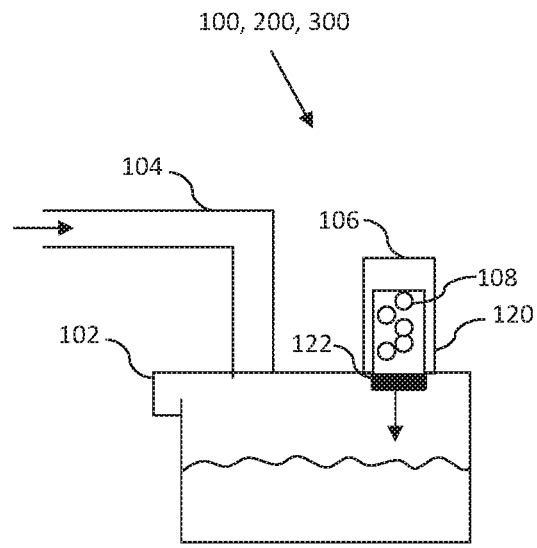

FIG. 6b illustrates an embodiment of the treatment delivery system 106 where the treatment distribution system 122 utilizes a drop-in system deliver the mineral composition 108. The drop-in system can be set by a timer, controlled by the controller, or operated manually. The drop-in system can have one of more storage sections 120 that can rotate to accommodate varying configurations. Further, the drop-in system can utilize a scale to ensure that the proper amount of mineral composition 108 is correct before dropping in. The remaining reference numbers are shown for context.

Figure 6C:
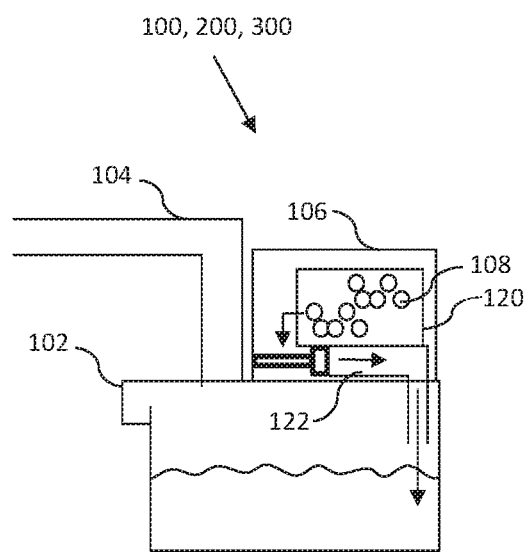

FIG. 6c illustrates an embodiment of the treatment delivery system 106 where the treatment distribution system 122 utilizes a piston system deliver the mineral composition 108. The remaining reference numbers are shown for context.

Figure 6D:
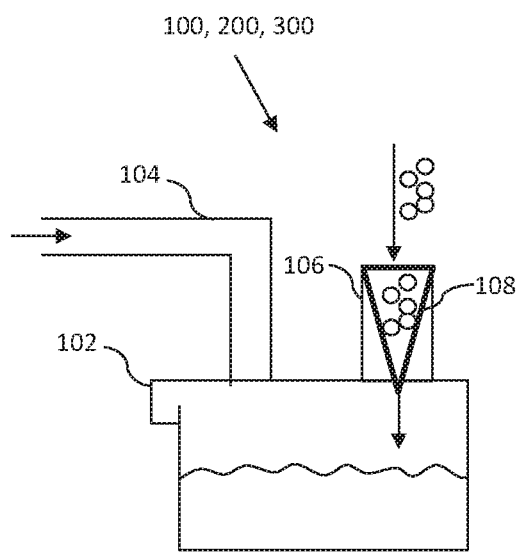

FIG. 6d illustrates an embodiment of the treatment delivery system 106 that does not have a treatment distribution system 122 to deliver the mineral composition 108. Instead, the treatment delivery system 106 is a manually loaded system. A user of the system simply loads the mineral composition 108 directly into the treatment delivery system 106 (e.g., from the top) and flows to the first container 102. Such an embodiment may be useful if the treatment distribution system 122 fails, or the embodiment may be used on lower end models to save cost. The remaining reference numbers are shown for context.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A system for treating and distributing drink water, the system comprising:
    a first container;
    an input conduit that supplies water to the first container;
    a first sensor that measures a characteristic of the water within the first container;
    a treatment delivery system that delivers a mineral composition into the first container;
    a controller that controls the treatment delivery system to selectively deliver the mineral composition into the first container based on the characteristic of the water measured by the first sensor, such that the mineral composition mixes with and dissolves in the water to produce treated water having a programmed mineral profile;
    a second container defining a storage container;
    a second-container total dissolved solids (TDS) meter disposed in the second container, and a water level sensor disposed in the second container, each of which produce sensor data, wherein the controller executes at least one algorithm to control the mixing of the mineral composition to the water supplied to the first container further based upon the sensor data associated with the second-container TDS meter and the water level sensor from the second container;
    a transfer conduit that transfers the treated water from the first container to the second container; and
    an output conduit coupled to the second container to distribute the treated water from the second container to a destination.

2. The system of claim 1 further comprising a filter disposed in the transfer conduit that filters treated water that is transferred from the first container to the second container.

3. The system of claim 1, wherein the water treatment delivery system further comprises a storage apparatus that stores the mineral composition.

4. The system of claim 1, wherein the water treatment delivery system comprises at least one of a piston delivery mechanism, an auger delivery mechanism, and a drop-in delivery mechanism.

5. The system of claim 1, wherein the water treatment delivery system further comprises a scale that verifies the amount of mineral composition before the mineral composition is delivered to the first container.

6. The system of claim 1 wherein:
    the input conduit comprises a first input conduit that supplies purified water;
    further comprising:
        a second input conduit that supplies non-purified water to the first container.

7. The system of claim 6, wherein the first input conduit comprises:
    a first conduit total dissolved solids (TDS) meter in-line with water flow therethrough; and
    a first conduit flowrate valve in-line that measures a flow rate of water passing therethrough; and
the second input conduit comprises:
    a second conduit total dissolved solids (TDS) meter in-line with water flow therethrough; and
    a second conduit flowrate valve in-line that measures a flow rate of water passing therethrough.

8. The system of claim 1, wherein the first sensor comprises a first-container total dissolved solids (TDS) meter, wherein the controller controls the treatment delivery system to selectively deliver the mineral composition in to the first container based on total dissolved solids in the water measured by the first-container TDS meter.

9. The system of claim 8 further comprising:
    a water level sensor disposed in the first container, wherein the controller controls the treatment delivery system to selectively deliver the mineral composition in to the first container based further on the water level in the first container.

10. The system of claim 1, further comprising a drain coupled to the first container that allows the system to empty the first container.

11. A process for treating and distributing drink water to a destination, the process comprising:
    supplying water from an input conduit into a first container;
    taking measurements of a characteristic of the water in the first container by using a first sensor;
    delivering, via a controller based on the measurements taken by the first sensor, a determined amount of mineral composition via a treatment delivery system, into the first container thus producing treated water;
    verifying the amount of mineral composition delivered into the first container;
    transferring the treated water from the first container to a second container using a transfer conduit;
    controlling the mixing of the mineral composition to the water supplied to the first container based upon sensor data from a total dissolved solids sensor in the second container and a water level sensor in the second container; and
    distributing the treated water from the second container to the destination by using an output conduit.

12. The process of claim 11, wherein delivering, via a controller based on the measurements taken by the first sensor, a pre-determined amount of mineral composition comprises delivering a mineral composition comprising at least one of sodium, chloride, potassium bicarbonate, magnesium, and calcium.

13. The process of claim 11, wherein verifying the amount of mineral composition delivered into the first container comprises:
    performing a first action if the amount of mineral composition delivered into the first container exceeds the pre-determined amount; and
    performing a second action if the amount of mineral composition delivered into the first container is below the pre-determined amount, wherein:
    the first action comprises draining a pre-determined amount of the treated water from the first container via a drain, and
    the second action comprises adding additional mineral composition into the first container.

14. The process of claim 13, wherein the first action comprises draining a pre-determined amount of treated water from the first container via a drain further comprises supplying a predetermined amount of water into first container.

15. The process of claim 11, wherein delivering, via a controller based on the measurements taken by the first sensor, a pre-determined amount of mineral composition via a treatment delivery system, into the first container thus producing treated water comprises:
   delivering the mineral composition via a treatment delivery system by at least one of a piston delivery mechanism, an auger delivery mechanism, and a drop-in delivery mechanism.

16. The process of claim 11, wherein delivering, via a controller based on the measurements taken by the first sensor, a pre-determined amount of mineral composition via a treatment delivery system, into the first container thus producing treated water comprises:
   delivering the mineral composition via a treatment delivery system by weighing the pre-determined amount of mineral composition on a scale before delivery of the mineral composition into the first container.

* * * * *